(12) United States Patent
Conroy et al.

(10) Patent No.: US 9,970,577 B2
(45) Date of Patent: May 15, 2018

(54) ROTARY UNION

(71) Applicant: The Procter & Gamble Company, Cincinnati, OH (US)

(72) Inventors: Mark Stephen Conroy, Colerain Township, OH (US); Thomas Timothy Byrne, West Chester, OH (US); Haibin Chen, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1187 days.

(21) Appl. No.: 14/038,957

(22) Filed: Sep. 27, 2013

(65) Prior Publication Data

US 2015/0091297 A1  Apr. 2, 2015

(51) Int. Cl.
| | | |
|---|---|---|
| *F16L 27/08* | (2006.01) | |
| *B41F 31/22* | (2006.01) | |
| *F16L 27/087* | (2006.01) | |
| *F16L 39/06* | (2006.01) | |

(52) U.S. Cl.
CPC ............ *F16L 27/082* (2013.01); *B41F 31/22* (2013.01); *F16L 27/087* (2013.01); *F16L 39/06* (2013.01)

(58) Field of Classification Search
CPC ....... F16L 39/06; F16L 27/087; F16L 27/082; B41F 31/22
USPC ................................ 285/272, 273; 464/7, 18
See application file for complete search history.

(56) References Cited

U.S. PATENT DOCUMENTS

| | | |
|---|---|---|
| 2,349,696 A | 5/1944 | Behrens |
| 2,557,140 A | 6/1951 | Razdowitz |
| 2,723,136 A | 11/1955 | Deubler et al. |
| 2,820,650 A | 1/1958 | Leopold |
| 3,002,769 A | 10/1961 | Deubler et al. |
| 3,017,202 A | 1/1962 | Swaney |
| 3,484,853 A | 12/1969 | Nishi |
| 3,501,174 A | 3/1970 | Walker |
| 3,586,051 A | 6/1971 | Walker et al. |
| 3,698,433 A | 10/1972 | Dobler et al. |
| 3,799,585 A | 3/1974 | Frost |
| 3,889,983 A | 6/1975 | Freize et al. |
| 3,923,125 A * | 12/1975 | Rosenthal ........... F16C 33/1085 184/6 |

(Continued)

FOREIGN PATENT DOCUMENTS

| | | |
|---|---|---|
| JP | 2003-165200 | 6/2003 |
| JP | 2012-239976 | 12/2012 |

OTHER PUBLICATIONS

Hidetoshi, Y., et al., Development of high speed side-through rotary union for the transfer of coolant, Nippon Kikai Gakkai Ronbunshu, C Hen/Transactions of the Japan Society of Mechanical Engineers, Part C, vol. 60(577), pp. 2938-2945 (1994) ISSN: 0387-5024 Abstract.

(Continued)

*Primary Examiner* — Greg Binda
*Assistant Examiner* — Zachary T Dragicevich
(74) *Attorney, Agent, or Firm* — Sarah M. DeCristofaro

(57) ABSTRACT

The present disclosure provides for the description of rotary unions. The described rotary unions are provided with a non-rotating union part and a rotating union part affixable to a rotating device. An exemplary rotary union can be positioned relative to a bearing supporting the rotating device and the rotating device or can be incorporated into a bearing supporting the rotating device.

7 Claims, 13 Drawing Sheets

(56) References Cited

U.S. PATENT DOCUMENTS

| | | | |
|---|---|---|---|
| 4,111,467 A | 9/1978 | De Fremery | |
| 4,192,559 A | 3/1980 | Hewitt | |
| 4,262,940 A | 4/1981 | Wiedenbeck et al. | |
| 4,296,952 A | 10/1981 | McCracken | |
| 4,477,107 A | 10/1984 | Ferguson et al. | |
| 4,497,379 A | 2/1985 | Mailliet et al. | |
| 4,557,506 A | 12/1985 | Hanks et al. | |
| 4,606,560 A | 8/1986 | McCracken | |
| 4,606,561 A | 8/1986 | Jackson | |
| 4,683,912 A * | 8/1987 | Dubrosky | F16L 39/06 |
| 4,735,262 A | 4/1988 | Lucas | |
| 4,758,026 A | 7/1988 | Timm | |
| 4,817,995 A | 4/1989 | Deubler et al. | |
| 4,858,961 A | 8/1989 | Nunogaki | |
| 4,928,997 A | 5/1990 | Reisener et al. | |
| 4,934,783 A | 6/1990 | Jacobson | |
| 4,976,282 A | 12/1990 | Kubala | |
| 5,022,686 A | 6/1991 | Heel et al. | |
| 5,080,401 A | 1/1992 | Stich | |
| 5,098,135 A | 3/1992 | Timm | |
| 5,104,154 A * | 4/1992 | Shibano | F16L 39/06 285/121.6 |
| 5,110,162 A | 5/1992 | Peter | |
| 5,160,173 A | 11/1992 | Le Devehat | |
| 5,195,786 A | 3/1993 | Guardiani | |
| 5,199,748 A | 4/1993 | Jung et al. | |
| 5,226,677 A | 7/1993 | Peter et al. | |
| 5,303,959 A | 4/1994 | Medsker | |
| 5,462,083 A | 10/1995 | Kaspar | |
| 5,538,292 A | 7/1996 | Sommer | |
| 5,607,189 A | 3/1997 | Howeth | |
| 5,617,879 A | 4/1997 | Kubala | |
| 5,651,567 A | 7/1997 | Kaleniecki et al. | |
| 5,669,636 A | 9/1997 | Kubala | |
| 5,676,402 A | 10/1997 | Eley et al. | |
| 6,029,695 A | 2/2000 | Logan | |
| 6,073,970 A | 6/2000 | Ott et al. | |
| 6,085,782 A | 7/2000 | Ott | |
| 6,164,316 A | 12/2000 | Betti | |
| 6,402,202 B1 | 6/2002 | Colombo | |
| 6,406,065 B1 | 6/2002 | Ott et al. | |
| 6,412,822 B1 | 7/2002 | Omiya et al. | |
| 6,431,202 B1 | 8/2002 | Ahlgren et al. | |
| 6,485,062 B2 | 11/2002 | Omiya et al. | |
| 6,508,472 B2 | 1/2003 | Omiya et al. | |
| 6,530,397 B2 | 3/2003 | Suzuki et al. | |
| 6,647,883 B1 | 11/2003 | McNeil | |
| 6,862,983 B2 | 3/2005 | Bornhorst | |
| 6,989,799 B1 | 1/2006 | Pittman, II et al. | |
| 7,004,509 B2 | 2/2006 | Beach et al. | |
| 7,083,200 B2 | 8/2006 | Falconer | |
| 7,150,477 B2 | 12/2006 | Reifschneider et al. | |
| 7,156,426 B2 | 1/2007 | Tries et al. | |
| 7,191,797 B2 | 3/2007 | Jensen et al. | |
| 7,229,102 B2 | 6/2007 | Kubala | |
| 7,328,921 B1 | 2/2008 | Miciukiewicz | |
| 7,343,968 B2 | 3/2008 | Kubala | |
| 7,422,031 B2 | 9/2008 | Benson et al. | |
| 7,475,914 B2 | 1/2009 | Pospisil et al. | |
| 7,556,294 B2 | 7/2009 | Schutt et al. | |
| 7,692,553 B2 | 4/2010 | Kubala | |
| 7,815,224 B2 | 10/2010 | Ford et al. | |
| 7,823,929 B2 | 11/2010 | Hoff et al. | |
| 8,047,576 B2 | 11/2011 | Ford et al. | |
| 8,333,464 B2 | 12/2012 | Hirato | |
| 8,342,092 B2 | 1/2013 | Kasper et al. | |
| 8,453,675 B2 | 6/2013 | Burrus et al. | |
| 9,592,699 B2 | 3/2017 | Stowe et al. | |
| 2005/0046181 A1 * | 3/2005 | Falconer | F16L 39/06 285/121.6 |
| 2008/0302994 A1 | 12/2008 | Syzkulski | |
| 2009/0205520 A1 | 8/2009 | Schafer et al. | |
| 2010/0060688 A1 | 3/2010 | Hirato | |
| 2010/0067483 A1 | 3/2010 | Ahluwalia | |
| 2011/0227334 A1 | 9/2011 | Grimmel et al. | |
| 2012/0213472 A1 | 8/2012 | Violante et al. | |
| 2013/0186290 A1 | 7/2013 | Paul et al. | |

OTHER PUBLICATIONS

Heidenheim, M., Less is more, Germany launches new generation of rotary joints, Professional Papermaking, vol. 1, pp. 104 (2004).
Anon, New Development for the Printing Industry, Export Polygraph International, vol. 4, p. 36 (1992).
Anonymous, New products from JoCo, British Paper Machinery, vol. 78, pp. 5 (1993).
PCT International Search Report, dated Feb. 9, 2015, 98 pages.

* cited by examiner

ROTARY UNION

FIELD OF THE INVENTION

The present disclosure relates to rotary unions. More particularly, the present disclosure relates to rotary unions used for supplying and/or removing a pressurized fluid into a high-speed rotating device. The rotary union is provided with a non-rotating union part and a rotating union part affixable to a rotating device. The rotary union can be positioned between a bearing supporting the rotating device and the rotating device. Alternatively, the rotary union can incorporate a bearing supporting the rotating device.

BACKGROUND OF THE INVENTION

A rotary union is generally recognized as a mechanism used to transfer fluid (under pressure or vacuum) from a stationary inlet to a rotating outlet. The rotary union is generally capable of preserving and isolating a fluid connection disposed between the stationary inlet and the rotating outlet. Rotary unions are utilized in a variety of applications—from compact rotary unions for the semiconductor industry to large, rugged-duty fluid swivels for industrial applications. Additionally, a variety of materials, sealing technology, and bearing types can be incorporated.

Rotary unions generally comprise a non-rotating union part connected to an external fluid supply and a rotating union part that is or can be affixed to a rotating device and rotates together with the rotating device. Seals are generally arranged between the non-rotating union part and the rotating union part. A rotary union can be referred to as a rotating union, swivel joint, rotary valve, rotary coupling, rotary joint, rotating joint, hydraulic coupling, pneumatic rotary union, through bore rotary union, air rotary union, electrical rotary union, vacuum rotary union, and the like. The axis of rotation of the rotary union is generally co-linear with the axis of rotation of the rotating device.

Rotary unions can be designed to endure a large range of temperatures and pressures. In addition, rotary unions may integrate multiple independent flow connections (passages) and handle different types of media simultaneously. A rotary union can generally lock onto an input valve while rotating to meet an outlet. During this time fluidic media can flow into the rotary union from a source external to the rotary union and can be held within the device during its movement. This fluidic media leaves the rotary union where the valve openings meet during rotation allowing more fluidic media to flow into the union again for the next rotation. Often functioning under high pressure and constant movement a rotary union is designed to rotate around an axis.

Rotary unions can be utilized and cooperatively function with contact printing and/or coating systems. Such contact systems (also known to those of skill in the art as print cylinders) are generally formed from components that displace a fluid onto a web substrate or article from a channel positioned internally to such a print cylinder to, for example, print an image or coat a pattern onto the substrate. An exemplary print cylinder can be provided as a gravure cylinder. Such a print cylinder can be used to carry a desired pattern and quantity of ink and transfer a portion of the ink from an internally-positioned channel to a web material that has been placed in contact with the print cylinder.

In any regard, the exemplary internally-fed gravure cylinder can be used to apply a broad number and range of fluids to a web substrate at a target rate and in a desired pattern. A suitable contact printing system incorporating a gravure cylinder can apply more than just a single fluid (e.g., can apply a plurality of individual inks each having a different color) to a web substrate when compared to a conventional externally-supplied gravure printing system that only applies a single ink. Represented mathematically, the contact printing system envisioned can use a gravure cylinder (central roll) and can print X colors upon a web substrate utilizing Y printing components where X and Y are positive integers and $0<Y<X$.

In an exemplary gravure system, pre-determined ink channel networks provided to each cell can typically be connected to individual color ink reservoirs disposed at the desired printing location upon the surface of the gravure cylinder. Providing a distribution system in this manner can ensure that any part of a print design disposed upon the surface of gravure cylinder and disposed any location upon the surface of the roll can be fed by a connected ink channel for a designed ink color at designed flow rate.

By convention, rotary unions are generally disposed external to the bearing that supports the shaft of the rotating device (i.e., on the bearing side opposite the rotating device so supported). This is because one of skill in the art will feed fluids into the rotating device at a position near the axis of rotation. This provides the ability to incorporate such fluid feeds into the shaft that supports the rotating device. This is the current industry standard for roll design.

Further, it is understood that high rotational (line) speeds are considered highly desirable for increased production rates. However, it was found that when currently available rotary unions, whether or not they are connected to a rotating device such as the exemplary internally-fed gravure printing system described supra, provide a fluid near the axis of rotation and are rotated at a high circumferential speed, the centrifugal force was found to create a region of low pressure (i.e., "pull a vacuum") in the fluid passages, or the portions of fluid passages, disposed within the region of the rotary union that is proximate to the axis of rotation of the rotating union part. This region of low pressure is thought to provide three undesirable phenomena in operations where high rotational velocities are required:

1. When the rotating union part reaches a certain rotational speed, the local pressure in any channel, or portion(s) thereof, disposed within the rotating union part that are proximate to the axis of rotation is reduced below the vaporization pressure of the fluid at the local temperature. The fluid is caused to vaporize and form gas bubbles. This phenomenon can be considered to be analogous to the cavitation observed in a hydraulic pump operating at high rpm.
2. If the fluid is not deaerated properly, the size of any entrained air bubbles in the fluid will increase as the pressure drops.
3. According to Henry's law, the amount of air dissolved in a fluid is proportional to the local pressure. When a fluid transported from a position external to the rotary union to the rotary union center, the pressure exerted upon the fluid changes from atmospheric to a near vacuum. Part of this dissolved air can then released in the form of bubbles in the fluid.

According to the ideal gas law, the gas or air bubble volume is inversely proportional to the local pressure. Therefore, the size of bubbles within the fluid will increase as the rotational speed increases. This is because the pressure in the fluid passages of the rotary union located in the region near the rotational axis decreases as the rotational speed increases. These gas or air bubbles introduce difficulties in high rotational speed operations, such as printing and coating. These can include undesirable flowrates, partial blockages within the internal roll piping, noise, vibration, and damage to the piping network. The latter can be considered analogous to the damage due to cavitation caused by an impeller.

Thus, one of skill in the art will recognize that such undesired phenomena caused by these centrifugal forces such as those described supra, must be controlled to enhance the speed and performance of equipment used in material processing technologies. A design that controls and increases the performance of high-speed rotary unions is needed in manufacturing. Clearly, a design that can correlate equipment design, fluid dynamics, and high-speed manufacturing is needed.

The rotary union of the present disclosure overcomes these problems associated with the prior art by providing a rotary union for use in a fluid delivery system that is capable of transporting single or multiple fluids, reducing sealing problems, and controlling the pressure drop due to high-speed rotation of internally-fed rolls at the fluid inputs, prevents the creation of a region(s) of low pressure in an economical manner, and mitigates these effects by allowing an internally-fed rotating device to be provided with a fluid at a position other than near the axis of rotation or through the shaft supporting the rotating device. The disclosed rotary union can be modified to accommodate different numbers of flow channels, is designed to ensure efficient rotation between incoming and outgoing conduit arrangements, and provide a better placement options between the rotating device and the bearings supporting the rotating device shaft.

SUMMARY OF THE INVENTION

The present disclosure provides a rotary union comprising a rotating union part rotatable about an axis and matingly engageable with a rotating device, a non-rotating union part disposed coaxially about the rotating union part, and a fluid passage disposed within the rotary union. The rotating device is rotatable about the axis and has at least one fluid channel disposed therein. The rotating device is disposed about, and supported by, a shaft supported by a support bearing. The fluid passage comprises a fluid material inlet disposed upon a surface of the non-rotating union part, a first portion in fluid communication with the fluid material inlet disposed within the non-rotating union part, and a second portion disposed within the rotating union part and having a fluid material outlet disposed upon a surface of the rotating union part. The surface of the rotating union part is matingly engageable with the surface of the rotating machine part to provide fluid communication of the fluid material from the fluid passage to the fluid channel. A fluid is communicatable through the fluid passage from the fluid material inlet, through the first portion, into the second portion, to the fluid material outlet, and to the at least one fluid channel. The rotating union part and the non-rotating union part are disposed between the rotating device and the support bearing.

The present disclosure also provides a rotary union comprising a rotating union part rotatable about an axis and matingly engageable with a rotating device, a non-rotating union part disposed coaxially about the rotating union part and coupled to a support structure comprising support bearings, and a fluid passage disposed within the rotary union. The rotating device is rotatable about the axis and has at least one fluid channel disposed therein. The rotating device is disposed about, and supported by, a shaft supported by a support bearing. The support bearings are disposed between the non-rotating union part and the rotating union part. The fluid passage comprises a fluid material inlet disposed upon a surface of the non-rotating union part, a first portion in fluid communication with the fluid material inlet disposed within the non-rotating union part, and a second portion disposed within the rotating union part and having a fluid material outlet disposed upon a surface of the rotating union part. The surface of the rotating union part is matingly engageable with the surface of the rotating machine part to provide fluid communication of the fluid material from the fluid passage to the fluid channel. A fluid is communicatable through the fluid passage from the fluid material inlet, through the first portion, into the second portion, to the fluid material outlet, and to the at least one fluid channel.

The present disclosure further provides a rotary union comprising a non-rotating union part disposed about an axis, a rotating union part disposed coaxially about the non-rotating union part, and a fluid passage disposed within the rotary union. The rotating union part is matingly engageable with a rotating device rotatable about the axis. The rotating device has a web-contacting surface and has at least one fluid channel disposed therein. The fluid passage comprises a fluid material inlet disposed upon a surface of the non-rotating union part, a first portion in fluid communication with the fluid material inlet disposed within the non-rotating union part, and a second portion disposed within the rotating union part, and a fluid material outlet disposed upon a surface of the rotating union part. A fluid is communicatable through the fluid passage from the fluid material inlet, through the first portion disposed within the non-rotating union part, into the second portion disposed within the rotating union part, to the fluid material outlet, and to the fluid channel disposed within the rotating machine part. The non-rotating union part and the rotating union part are coaxially disposed about a shaft. The shaft is supported by a support bearing and the non-rotating union part and the rotating union part are disposed at a position between the support bearing and the rotating device.

DETAILED DESCRIPTION

According to the present description, it is believed that controlling the vaporization (e.g., the formation of gas or air bubbles) in liquids disposed in elongate pipes that can be rotated about an axis can be achieved by advancing the mathematical foundation of the pressures in such systems. In order to understand and evaluate the fluid vaporization process and use the results to describe the unique rotary union described herein, a review of the forces involved in the movement of fluidic media through a pipe (or fluid passage) orbiting about an axis of rotation is necessary. Using these results to design a rotary union suitable for use in high rotational velocity applications can result in the prevention or reduction of fluid vaporization within the fluid passage by careful selection of the position at which a fluid exits a rotary union relative to fluid channels disposed within a rotary device (such as an internally-fed gravure roll) attached and in fluid communication therewith. This involves the deliberate design of the fluid passages within the rotary union.

Figure 1:
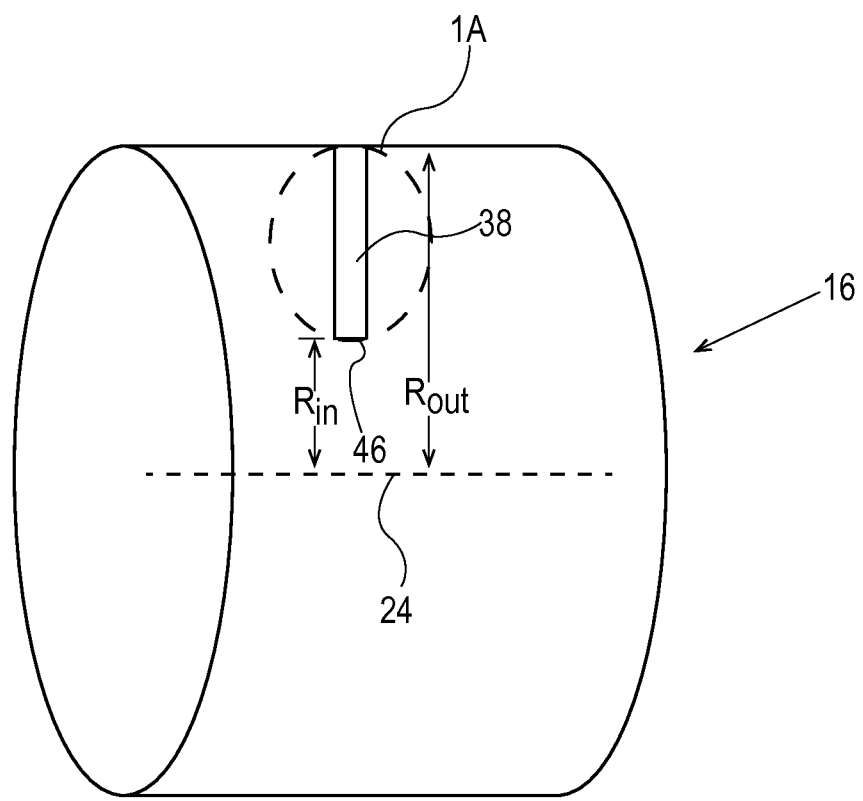
FIG. 1 is an exemplary rotational device having an exemplary pipe contained within used to demonstrate the forces in a pipe containing a fluid and used to derive Equation 15 infra.
Figure 1A:
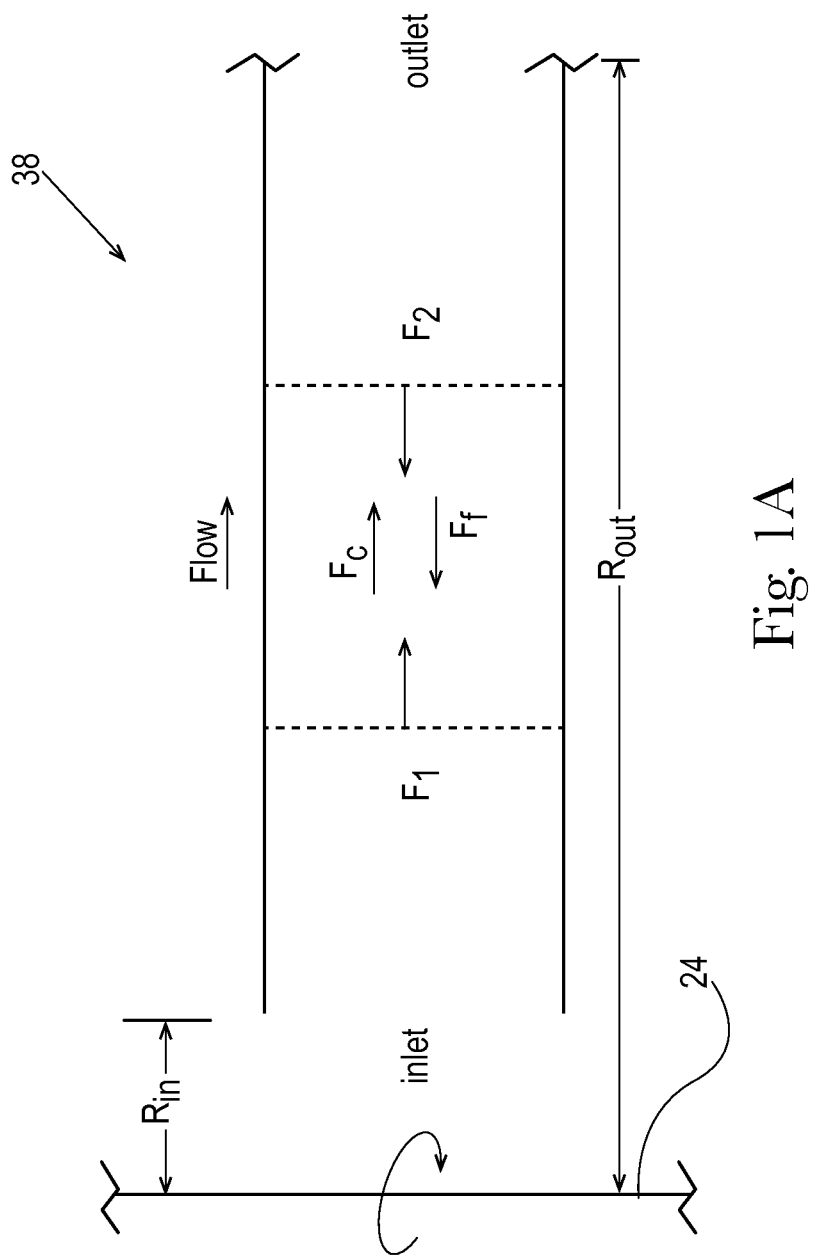
FIG. 1A is an exemplary pipe used to demonstrate the forces present in a pipe containing a fluid and disposed within the exemplary rotational device of FIG. 1 and used to derive Equation 15 infra.

FIG. 1 depicts an exemplary rotating device 16 having a fluid channel (or pipe) 38 capable of containing a fluid disposed therein. The fluid channel 38 has an inlet disposed at a distance, $R_{in}$, from the axis of rotation 24 and an outlet disposed at a distance, $R_{out}$, from the axis of rotation 24. FIG. 1A shows a system force balance analysis over a region of the fluid channel 38 disposed generally perpendicular to an axis of rotation 24. The fluid channel 38, filled with a fluid, generally rotates about the axis of rotation 24. In other words, the fluid channel 38 orbits about the axis of rotation 24. The force balances over the selected region of fluid channel 38 can be expressed as:

$$F_1 + F_c = F_2 + F_f \qquad \text{Equation 1}$$

where:
$F_1$ and $F_2$=Forces at sides of the region due to the static pressure,
$F_c$=centrifugal force, and
$F_f$=resistive force due to the friction.
The centrifugal force can be rewritten as:

$$F_c = m*a \qquad \text{Equation 2}$$

where:
m=mass of the fluid in the specific region, and
a=acceleration due to the rotation.
The acceleration due to the rotation, a, can be calculated from $$a = \omega^2 R \qquad \text{Equation 3}$$

where:
ω=angular velocity, and
R=distance from the axis of rotation to the center of infinitesimal fluid region.
Thus, Equation 1 can be rewritten as:

$$P_1 \pi r^2 + \rho \pi r^2 \Delta R(\omega^2 R) = P_2 \pi r^2 + F_f \qquad \text{Equation 4}$$

where:
$P_1$ and $P_2$=static pressure at sides of the region,
ρ=fluid density, and
r=radius of the pipe.
For simplicity, we can assume a cylindrical pipe to derive Equation 4. However, one of skill in the art will recognize that the following equations and results are independent of the cross-sectional shape of the pipe. Thus, dividing both sides of the equation by the cross sectional area $\pi r^2$, Equation 4 can be rewritten as:

$$\rho \Delta R(\omega^2 R) = P_2 - P_1 + \Delta P_f \qquad \text{Equation 5}$$

where:
$\Delta P_f$=pressure drop in the infinitesimal region due to the friction.
After integrating the left-hand side and right-hand side from the pipe inlet position to outlet position, we have:

$$\int_{R_{in}}^{R_{out}} \rho \omega^2 R \, dR = P_{out} - P_{in} + P_f \qquad \text{Equation 6}$$

where:
$R_{in}$ and $R_{out}$=the radius relative to the axis of rotation at the pipe inlet and outlet respectively,
$P_{in}$ and $P_{out}$=the static pressure at the pipe inlet and outlet respectively, and
$P_f$=the pressure drop throughout the pipe due to friction.
$P_f$ can be found by one of skill in the art in suitable engineering handbooks. Alternatively, one of skill in the art can calculate $P_f$ from the Hagen-Poiseuille equation if the flow through a long, constant cross section cylindrical pipe is laminar. For reference, the Hagen-Poiseuille equation is:

$$P_f = \frac{8 \mu l Q}{\pi r^4} \qquad \text{Equation 7}$$

where:
μ=fluid viscosity,
l=pipe length,
r=internal radius of the pipe and
Q=volumetric flow rate.
From Equation 6, we now have:

$$\tfrac{1}{2} \rho \omega^2 (R_{out}^2 - R_{in}^2) = P_{out} - P_{in} + P_f \qquad \text{Equation 8}$$

The roll surface velocity, v, can be calculated from $$v = \omega R_{out} \qquad \text{Equation 9}$$

By substituting surface velocity, v, (Equation 9) into Equation 8, one obtains:

$$\frac{1}{2} \rho v^2 \left(1 - \left(\frac{R_{in}}{R_{out}}\right)^2 \right) = P_{out} - P_{in} + P_f \qquad \text{Equation 10}$$

After rearrangement, one has:

$$\left(\frac{R_{in}}{R_{out}}\right)^2 = 1 - \frac{2(P_{out} - P_{in} + P_f)}{\rho v^2} \qquad \text{Equation 11}$$

To use a pipe to deliver a fluid, $P_{in}$ must be higher than fluid vapor pressure, $P_v$, at the applied temperature. Otherwise, the liquid at the inlet will undergo vaporization. Therefore it is reasonable to presume that $P_{in} > P_v$.

Therefore Equation 11 can be rewritten as:

$$\left(\frac{R_{in}}{R_{out}}\right)^2 > 1 - \frac{2(P_{out} - P_v + P_f)}{\rho v^2} \quad \text{Equation 12}$$

One of skill in the art will appreciate that two options exist relative to Equation 12; namely:

$$1 - \frac{2(P_{out} - P_v + P_f)}{\rho v^2} \le 0 \text{ and } 1 - \frac{2(P_{out} - P_v + P_f)}{\rho v^2} > 0.$$

In the case of the latter relationship (e.g., $$1 - \frac{2(P_{out} - P_v + P_f)}{\rho v^2} > 0$$

(i.e., is a positive, greater than zero value)) vaporization of the fluid is possible. The net effect is that $R_{in}$ must be a non-zero value (i.e., $R_{in}$ is displaced radially away from the axis of rotation). In other words:

$$1 - \frac{2(P_{out} - P_v + P_f)}{\rho v^2} > 0. \quad \text{Equation 13}$$

By way of example, when using an exemplary fluid suitable for use with the present invention (e.g., $H_2O$ @ 25° C.), it can be presumed that frictional losses through the pipe, $P_f$, are negligibly small (i.e., near zero). Using $H_2O$ @ 25° C., one can define a theoretical critical rotational velocity for an exemplary rotary system where the exemplary fluid is provided in a channel positioned internal to a rotary device (e.g., the rotary gravure system described supra) and the rotary device deposits the water onto a substrate contacting the rotary device from the internal channel at atmospheric pressure, $v_c$:

$$v_C = \sqrt{\frac{2(P_{out} - P_v + P_f)}{\rho}} = 14 \text{ m/s} = 2756 \text{ ft/min} \quad \text{Equation 14}$$

where known tabulated values are:
$P_{out}$=101325 Pa (atmospheric pressure @ STP),
$P_v$=3200 Pa (e.g., $H_2O$ vapor pressure at 25° C.), and
$\rho$=1000 kg/m³ (for $H_2O$ @ 25° C.).

Thus, in order to prevent the deleterious effects discussed supra, $v$<2755 ft/min for $H_2O$ @ 25° C. This rotational velocity limitation can prevent the use of rotational speeds greater than 2755 ft/min for $H_2O$ @ 25° C. for a manufacturing operation due to vaporization of the fluid within the pipe.

When the surface velocity has the relationship $v > v_c$, we see that a pipe design within a rotating object must satisfy the following equation:

$$\frac{R_{in}}{R_{out}} > \sqrt{1 - \frac{2(P_{out} - P_v + P_f)}{\rho v^2}} \quad \text{Equation 15}$$

for $H_2O$ @ 25° C. to prevent liquid from vaporizing at the pipe inlet.

Additionally, it is preferred that:

$$\frac{R_{in}}{R_{out}} < 1 \quad \text{Equation 16}$$

for $H_2O$ @ 25° C.

In addition, it is useful to note the following additional relationships:

Henry's Law states the gas dissolved in liquid is proportional to the partial pressure of the gas:

$$p = k_H c \quad \text{Equation 17}$$

where:
p is the partial pressure of the gas in equilibrium with the liquid;
$k_H$ is Henry's constant;
c is the dissolved gas concentration (eg. oxygen and nitrogen).

The equation for the ideal equation of state:

$$PV = n\acute{R}T \quad \text{Equation 18}$$

where:
P is the pressure of the gas;
V is the volume of the gas;
n is the amount of substance amount of substance of gas (also known as number of moles);
T is the temperature of the gas; and,
$\acute{R}$ is the ideal, or universal, gas constant.

Figure 2:
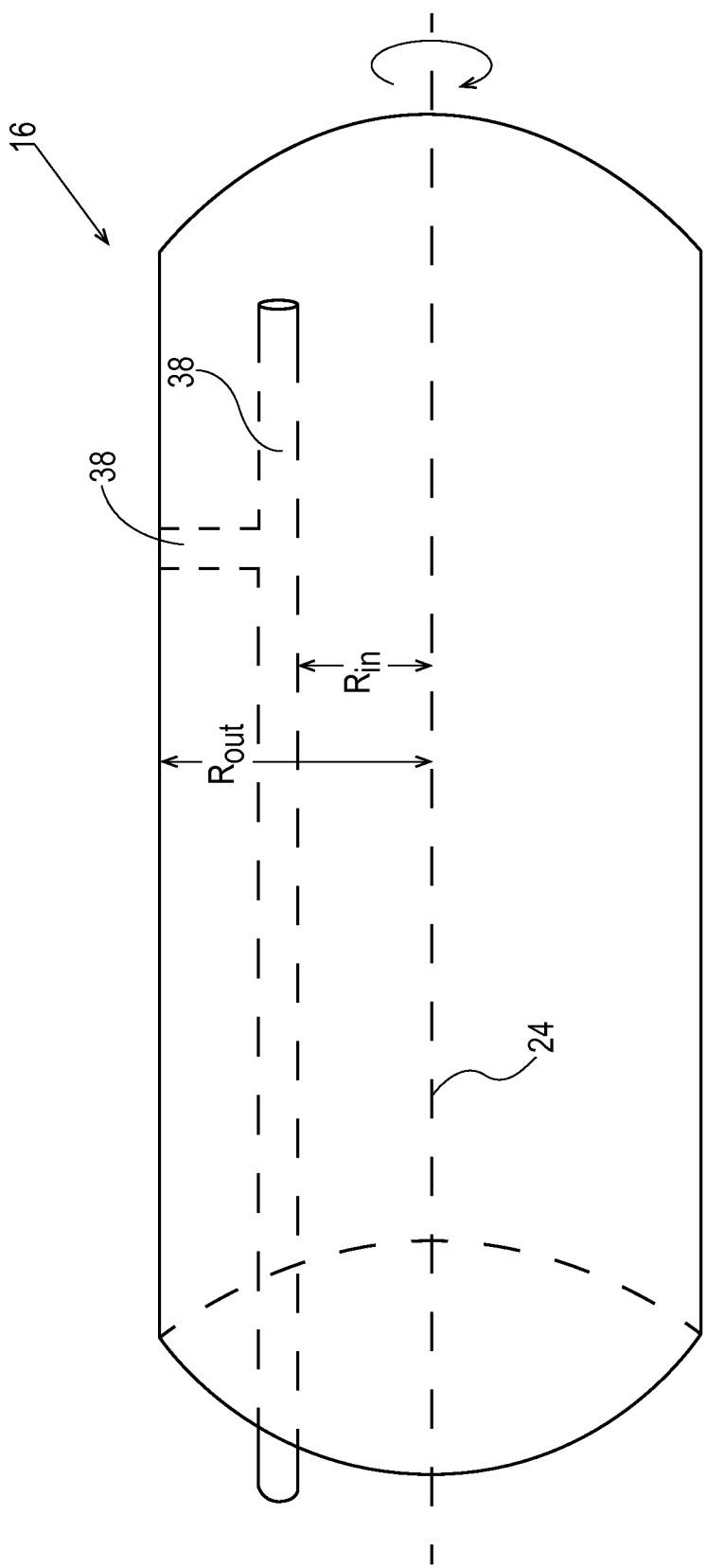
FIG. 2 is an exemplary pipe design through a rotating object showing an exemplary $R_{in}$ and $R_{out}$.
Figure 3:
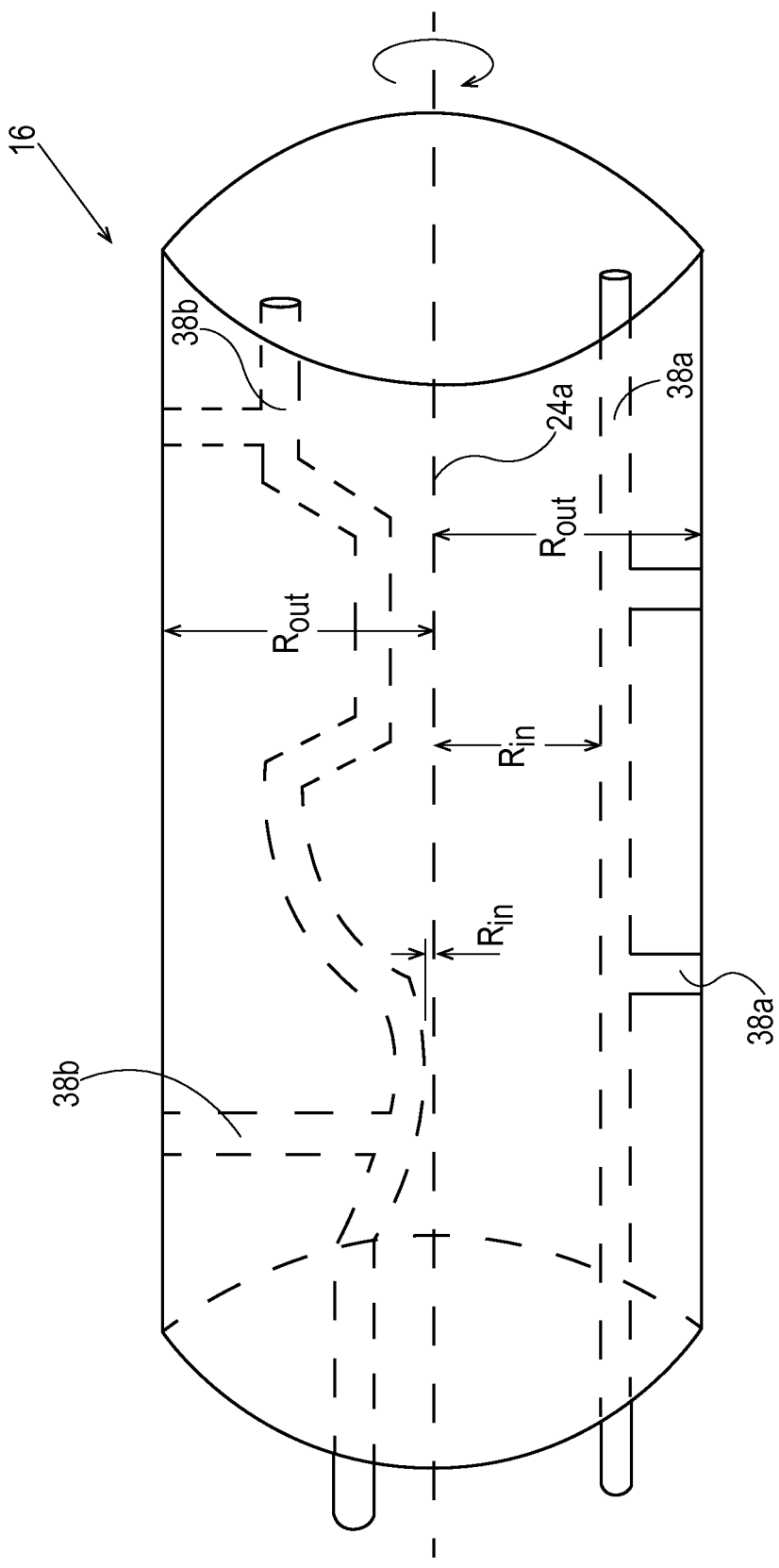
FIG. 3 are alternative exemplary pipe designs through a rotating object showing another exemplary $R_{in}$ and $R_{out}$.
Figure 4:
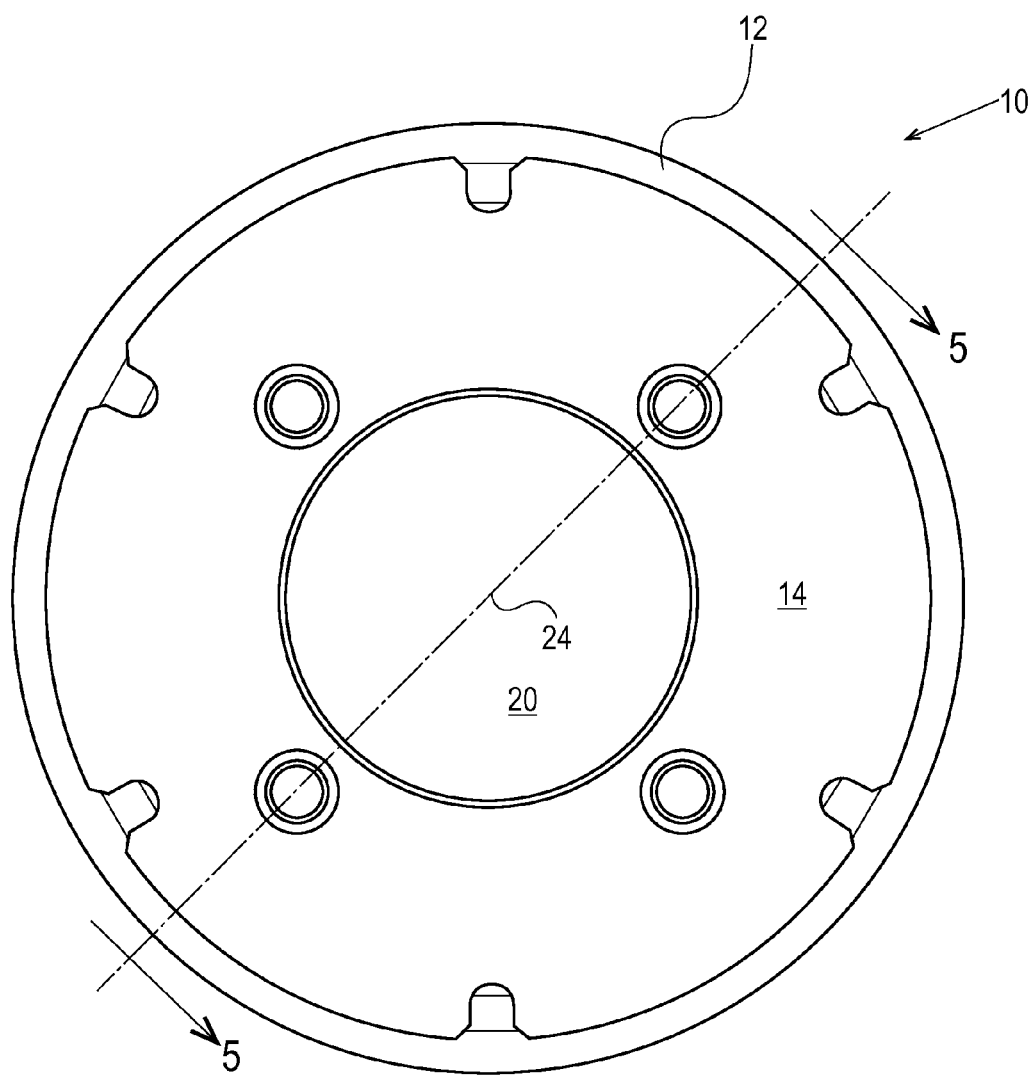
FIG. 4 is an elevational view of an exemplary embodiment of a rotary union according to the present description.
Figure 5:
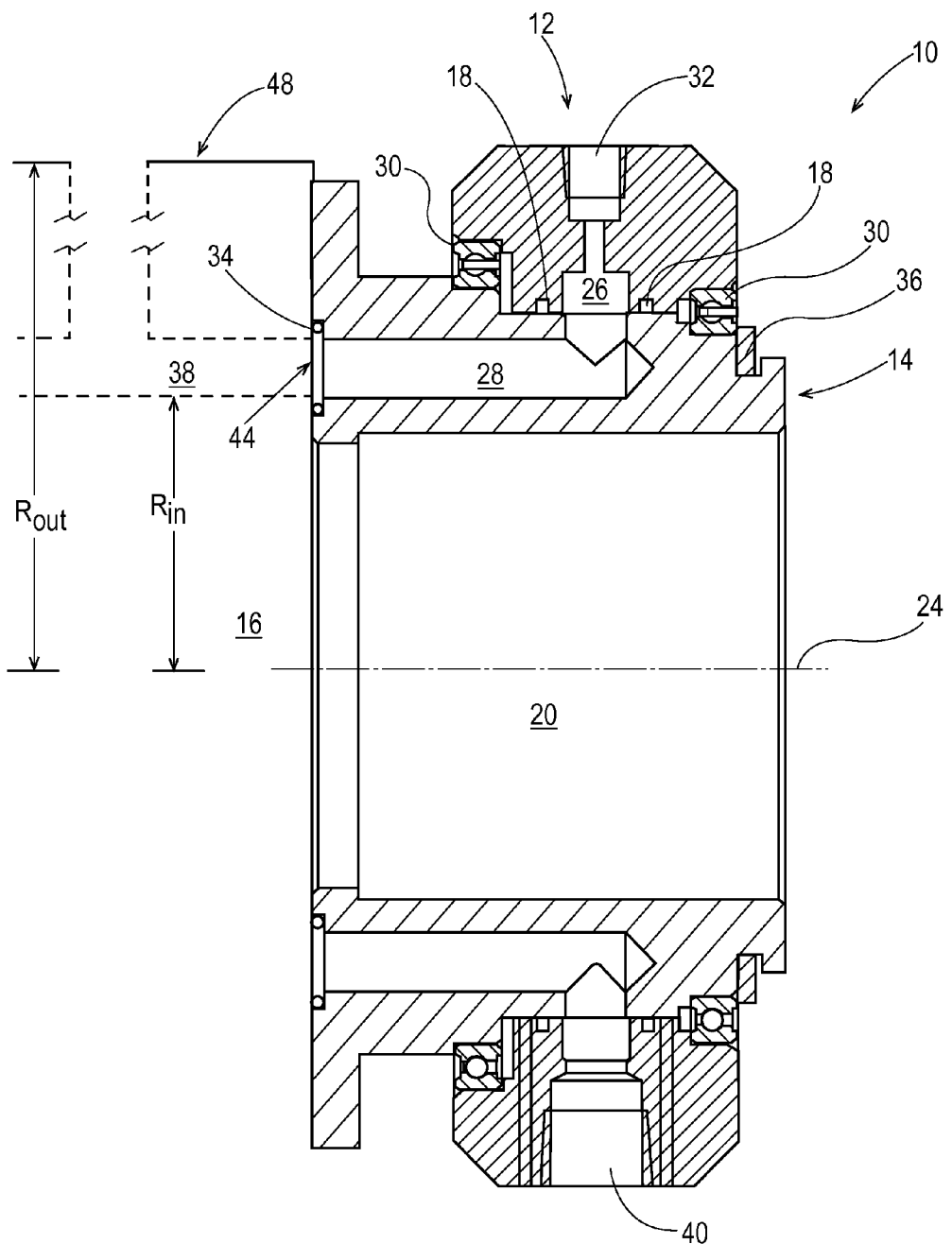
FIG. 5 is a cross-sectional view of the rotary union of FIG. 4 taken along the line 4-4.
Figure 6:
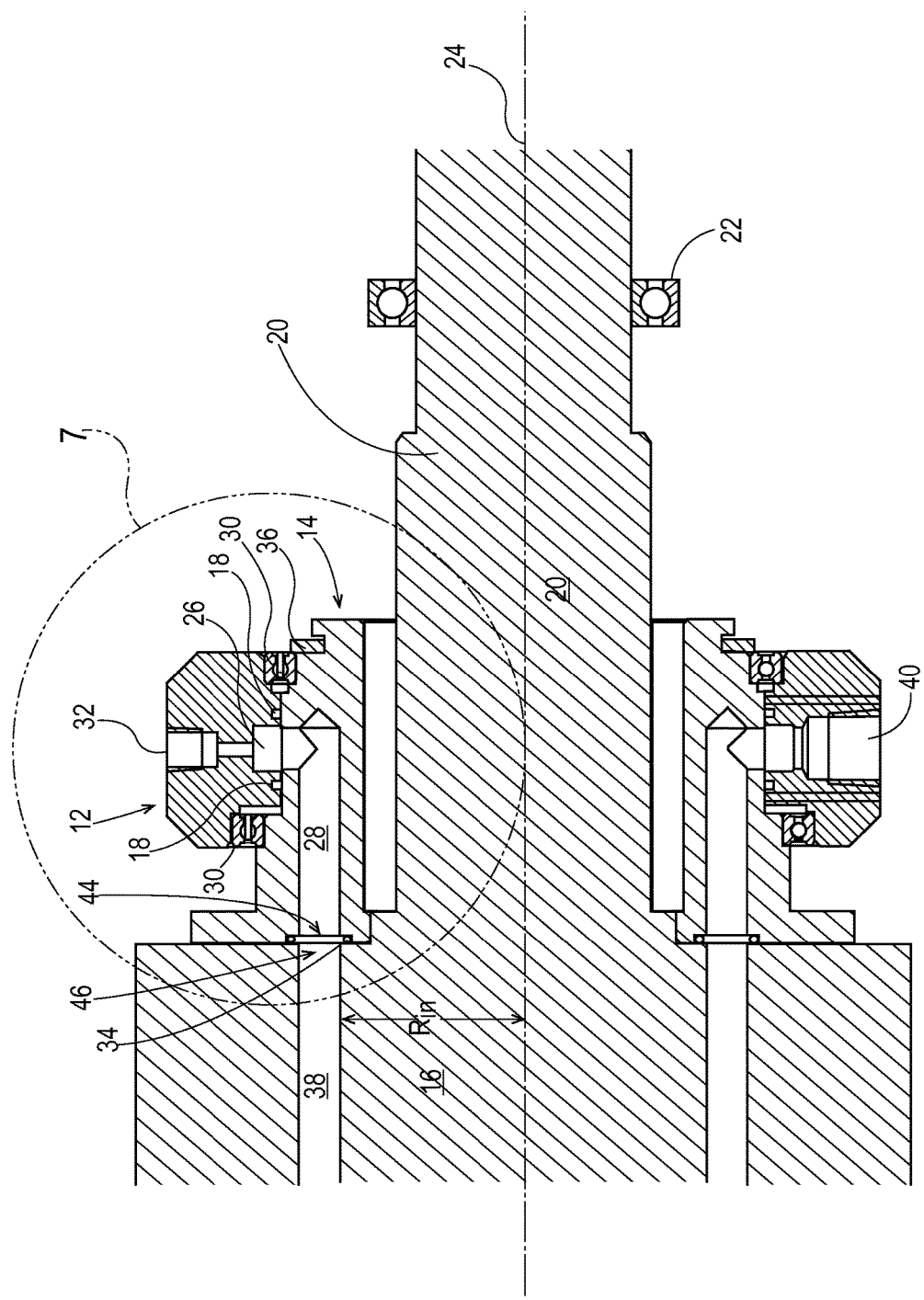
FIG. 6 is a cross-sectional view of the rotary union of FIG. 4 taken along the line 4-4 where the rotary union is placed in contacting and fluidic engagement with an exemplary process printing roll.
Figure 7:
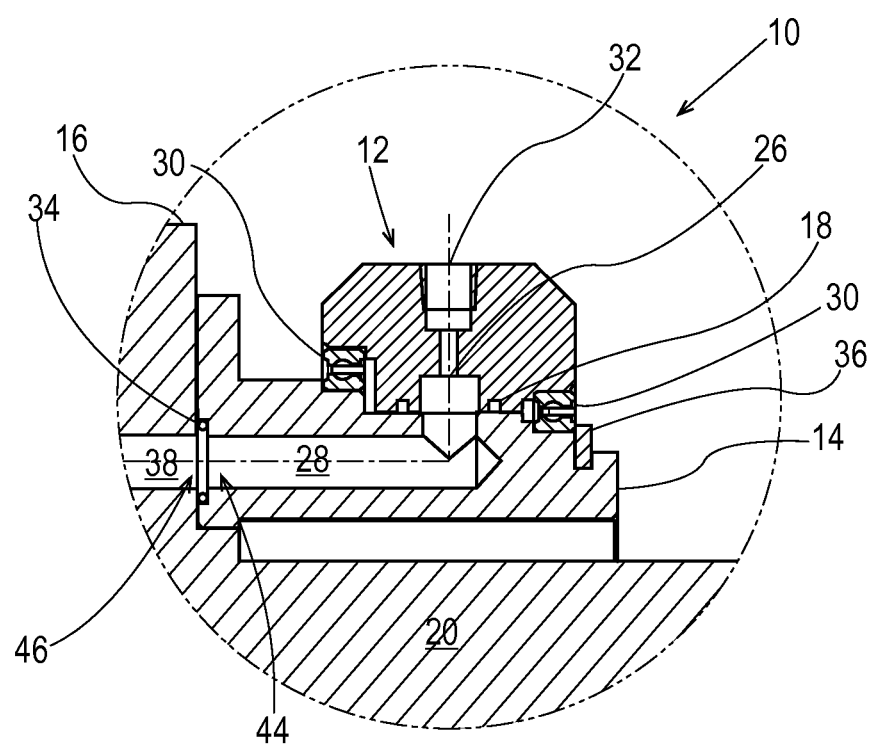
FIG. 7 is a cross-sectional view of the region labeled 7 of FIG. 6.

A representative drawing showing the relationships between $R_{in}$, $R_{out}$, and the axis of rotation 24 in a single fluid channel system that is generally parallel to and rotates about an axis of rotation 24 is shown FIG. 2. A representative drawing showing the above relationship between $R_{in}$ and $R_{out}$ in an exemplary multiple fluid channel system having two fluid channels 38a, 38b rotating about an axis of rotation 24a is shown FIG. 3. As shown in FIG. 3, it is not necessary that the entirety, or even any defined portion, of exemplary fluid channel 38b be continuously parallel (i.e., collinear) to the axis of rotation 24a.

Referring to FIGS. 2 and 3, using the mathematical derivation discussed above, for purposes of the present disclosure, the value of $R_{in}$ can be determined as the distance between the axis of rotation 24, 24a and the point at which any portion of a particular fluid channel 38, 38a, 38b, et seq., disposed within rotating device 16 or fluid passage 28 disposed within rotating union part 14 of rotary union 10 provided in fluid communication with a respective fluid channel 38, 38a, 38b, et seq., disposed within rotating device 16 comes closest to the axis of rotation 24, 24a. Each fluid channel 38, 38a, 38b, et seq., that may be present within a given rotating device 16 or fluid passage 28 disposed within rotary union 10 in fluid communication thereto can have its own associated $R_{in}$.

As shown in FIG. 3, it should be recognized that there can be deviations in the distance that portions of exemplary fluid channel 38b or fluid passage 28 (defined microscopically) is disposed from the axis of rotation 24a even though the general direction of flow of fluidic material macroscopically through the rotating device 16 or rotary union 10 may be considered to be generally parallel to the axis of rotation 24a. In other words, fluid channel 38 and/or fluid passage 28 are not required to be parallel with axis of rotation 24a.

Referring to FIGS. 2 and 3, using the mathematical derivation discussed above, for purposes of the present disclosure, the value of $R_{out}$ can be determined as the distance between the axis of rotation 24, 24a and the point at which a particular fluid channel 38, 38a, 38b, et seq., disposed within rotating device 16 terminates upon the web-contacting surface 48 of rotating device 16 relative to the axis of rotation 24, 24a. Each fluid channel 38, 38a, 38b, et seq., that may be present within a given rotating device 16 can have at least one portion of a fluid channel 38, 38a, 38b, et seq., that is in fluid communication with the surface of the rotating device and be disposed at a radial distance of $R_{out}$ from the axis of rotation 24, 24a.

FIGS. 4-7 provide an exemplary rotary union 10 commensurate in scope with the present disclosure. Rotary union 10 has a rotating union part 14 that is rotatable about an axis of rotation 24 and has a fluid passage 28 disposed within the rotating union part 14. At least a portion of the fluid passage 28 is disposed at a distance $R_{in}$ relative to the axis of rotation 24 and can be adapted to be affixed to an exemplary rotating device 16 to provide fluid communication between fluid passage 28 and a fluid channel 38 disposed within rotating device 16 at a fluid material outlet 44. Fluid channel 38 of rotating device 16 is adapted to provide fluid communication with the surface 48 of rotating device 16 at a distance $R_{out}$ relative to the axis of rotation 24. The rotary union 10 also generally comprises a rotating union part 14 that is dynamically balanced with non-rotating union part 12 about the longitudinal axis 24. As would be understood by one of skill in the art, rotating union part 14 generally rotates together with the rotating device 16. As shown, the non-rotating union part 12 and the rotating union part 14 are generally positioned in an annular or coaxial relationship with the non-rotating union part 12 disposed generally about the rotating union part 14. Seals 18 can be generally arranged between the non-rotating union part 12 and the rotating union part 14 to facilitate the fluid communication of a fluid between a first portion of fluid passage 28 disposed within non-rotating union part 12 and a second portion of fluid passage 28 disposed within rotating union part 14. As would be understood by one of skill in the art, a rotary union 10 is used to supply channels 38 disposed within rotating device 16 with a fluidic material. Rotating device 16 is generally supported by shaft 20 in a manner that facilitates cooperative rotation of the rotating device 16 and the rotating union part 14 matingly and cooperatively attached thereto about the longitudinal axis 24. Shaft 20 is generally supported by support bearings 22. As will be discussed infra, the support bearings 22, 22a, 22b, 22c, et seq. can be positioned between rotary union 10c and rotating device 16c (e.g., FIG. 10), outside the conjoined rotary union 10b and rotating device 16b (e.g., FIG. 11), or even incorporated into the rotary union 10d (e.g., FIG. 12) by being disposed between rotating union part 14d and non-rotating union part 12d which has been coupled to a support structure 42.

Rotary union 10 can be produced according to a variety of constructions as would be known to one of skill in the art or as is generally shown in the drawings attached hereto. A first portion of fluid passage 28 disposed within non-rotating union part 12 is provided in fluid communication with a source of pressurized fluidic material through fluid material inlet 40 and fluid ring 26. A second portion of fluid passage 28 is disposed within rotating union part 14, as described supra, and generally orbits about the axis of rotation 24. Seals 18 disposed between non-rotating union part 12 and rotating union part 14 can provide exclusive (e.g., sealed) fluid communication of a fluid from the first portion of fluid passage 28 disposed within non-rotating union part 12 to the second portion of fluid passage 28 disposed within rotating union pan 14 and also prevent the egress of fluid into regions not proximate to the junction between the portion of fluid passage 28 disposed within non-rotating union part 12 and the portion of fluid passage 28 disposed within rotating union part 14.

The second portion of fluid passage 28 disposed within rotating union part 14 provides a fluid material outlet 44 that interfaces with fluid channel 38 disposed within rotating device 16 to preferably provide sealed fluid communication. The second portion of fluid passage 28 is preferably disposed within rotating union part 14 at a distance relative to the axis of rotation 24 that provides a value of $R_{in}$ relative to the associated $R_{out}$ of fluid channel 38 upon the surface 48 of rotating device 16 in accordance with Equation 15, described supra.

As shown in FIGS. 5-9, non-rotating union part 12 is preferably coaxially disposed about rotating union part 14. In other words, rotating union part 14 can be received within a cavity formed within non-rotating union part 12 to provide a coaxial relationship between rotating union part 14 and non-rotating union part 12. Rotating union part 14 can be secured to and secured thereto by a retaining clip 36 and is preferably secured to the rotating device 16 by means known to those of skill in the art for securing mechanical members together including bolts that can extend into the mating end of rotating device 16. Additionally, suitable static sealing members 34, such as O-rings and the like known to those of skill in the art, can be provided for sealing fluid channel 38 of rotating device 16 to fluid passage 28 of rotary union 10 to create exclusive fluid communication by and between inlet 46 of fluid channel 38 of rotating device 16 and fluid material outlet 44 of fluid passage 28 of rotary union 10. One of skill in the art will understand that conventionally, the longitudinal axis of the rotary union 10 is the same as the longitudinal axis of rotating device 16.

Fluid material inlet 40 and fluid ring 26 can be formed in non-rotating union part 12 to provide fluid communication between the first portion of fluid passage 28 disposed within non-rotating union part 12 and the second portion of fluid passage 28 disposed within rotating union part 14. Alternatively, fluid material inlet 40 and fluid ring 26 can be formed in rotating union part 14 to provide fluid communication between the first portion of fluid passage 28 disposed within non-rotating union part 12 and the second portion of fluid passage 28 disposed within rotating union part 14.

Suitable provisions are also provided for providing fluid communication between fluid passage 28 and bleed port 32. In a preferred embodiment, bleed port 32 is provided in an orientation that disposes bleed port 32 at the top of non-rotating union part 12 of rotary union 10. In any regard, bleed port 32 should be disposed in an orientation that facilitates the removal of any vapors disposed within fluid passage 28 and/or fluid ring 26 of rotary union 10 or fluid channel 38 of rotating device 16 and to form a passageway extending therebetween. Suitable fluid conduit connections can be provided in fluid communication with fluid material inlet 40, fluid passage 28, fluid channel 38, and bleed port 32. Bleed port 32 is preferably provided as a bleeder valve that is closed once any entrained air/gas is purged from the system.

One of skill in the art will recognize that a bleeder valve works by releasing air, or gas through a valve opening to reduce any built-up pressure existing inside a contained environment to remove excess air or gas within that contained environment. A preferred bleeder valve may be provided with a manually operated or automatic valve opening that serves as an exit point for air, gas, or other fluid. The main functioning component is the valve itself, which can be provided as a simple opening. Other components, such as automatic controls, pressure sensing parts, springs and levers, can depend on the type of valve and system such components are used on.

Rotary union 10 can further include bearings 30 to enable the removeable and rotatable mounting of rotating union part 14 to a shaft or other inner element disposed within rotating device 16. Bearings 30 are held in position (i.e., are captive) relative to non-rotating union part. 12 and rotating union part 14 by retaining clip 36.

Figure 9:
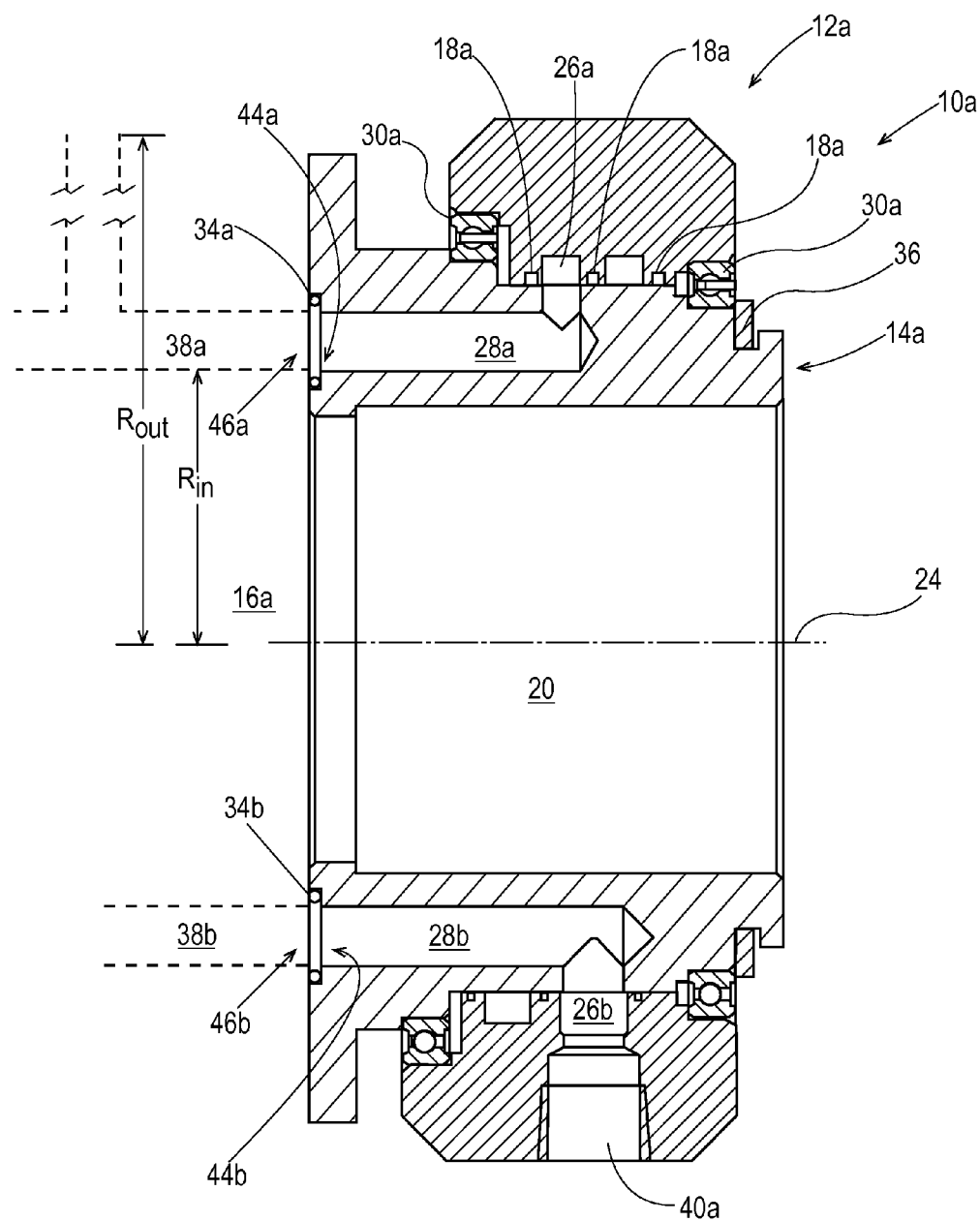
FIG. 9 is a cross-sectional view of the rotary union of FIG. 8 taken along the line 8-8.

Seals 18 and fluid ring 26 can be provided and positioned between the non-rotating union part 12 and rotating union part 14 to seal the first and second portions of fluid passages 28 disposed within the non-rotating union part 12 and rotating union part 14 respectively to prevent cross-contamination of fluidic materials from one fluid passage 28a to an adjacent fluid passage 28b in a multi-fluidic rotary union (see FIG. 9). A surface providing contacting engagement between the non-rotating union part 12 and/or rotating union part 14 may be treated with a friction-reducing material or substance (e.g., tungsten chromium carbide) that can act as a bearing surface. When configured in this manner, these coaxially disposed/annular components may act bearingly against each other. In the event that the shaft 20 changes shape due to pressure and/or temperature fluctuations in the carried fluids or the shaft 20 experiences any sideways directed loads, such movements can accommodated as the seals 18 can "float" with the shaft to find a 'best' position. As one skilled in the art would recognize seals 18 could be provided and, without limitation, include seal types such as face seals, labyrinth seals, and the like, etc.

Also, where it is indicated that the source of fluid pressure and non-rotating union part 12 are stationary, this is, of course, only a frame of reference. The rotation of shaft 20, rotating union part 14, and any associated rotational control apparatus portions as described are with respect to the rotational position of the source of fluid pressure. Of course, if the source of fluid pressure is rotating, the other parts described would have rotational relationships with respect to the rotational position of the source of fluid pressure. Further, it should be immediately obvious that any rotational control apparatus which requires parts or portions to be fluidically actuated and are rotating at differing speeds are intended to be embraced herein.

Figure 8:
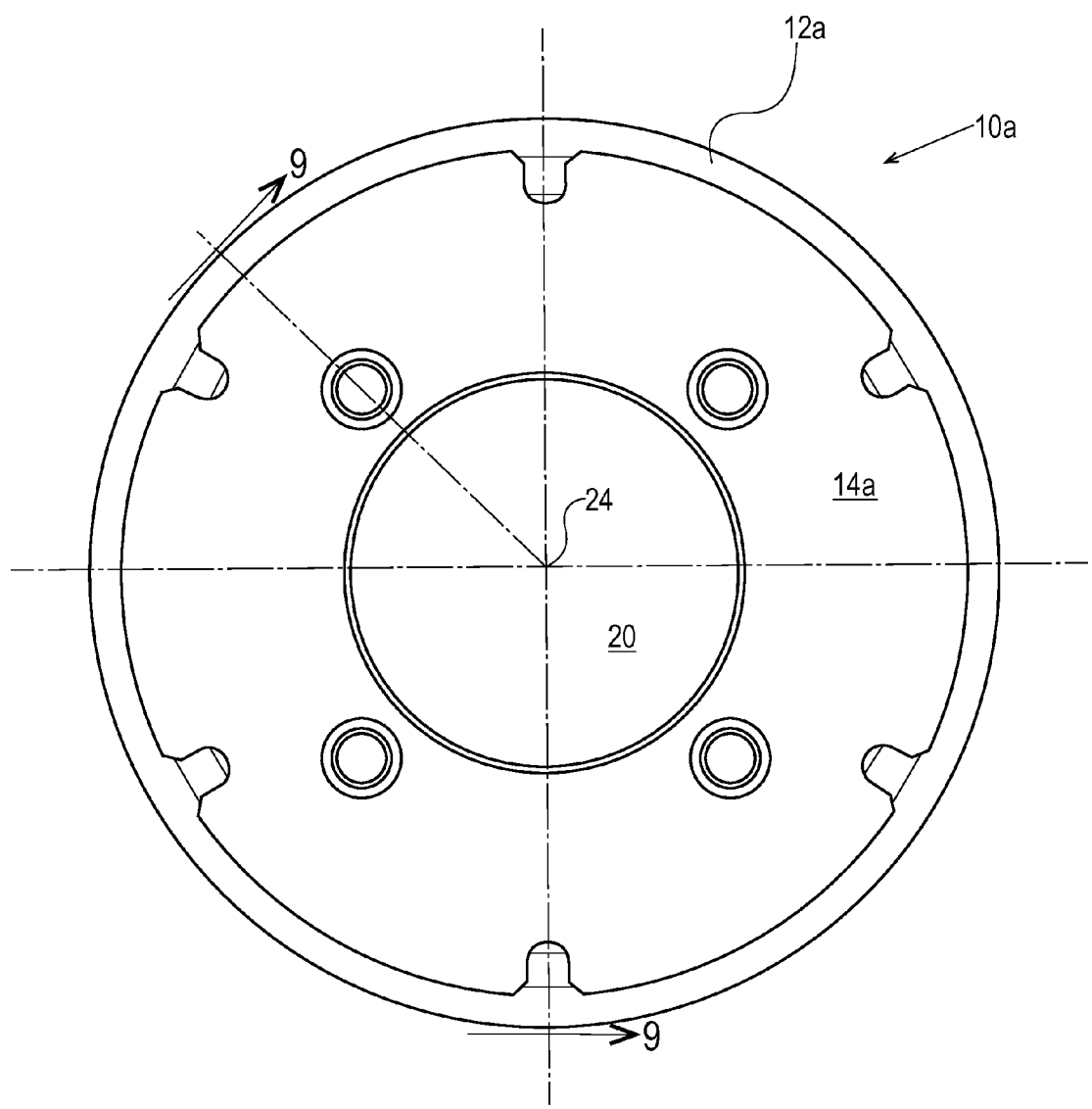
FIG. 8 is an elevational view of an alternative embodiment of a rotary union according to the present description.

An exemplary multiple fluid rotary union 10a affixed to a rotating device 16 is shown in FIGS. 8-9. This embodiment of a rotary union according to the present invention is constructed in a similar manner to the embodiment shown in FIGS. 4-7. The rotary union 10a generally comprises a non-rotating union part 12a and a rotating union part 14a that are dynamically balanced about a longitudinal axis 24 and rotate together with the rotating machine part 16a. The non-rotating union part 12a and the rotating union part 14a are positioned in an annular or coaxial relationship with the non-rotating union part 12a disposed generally about the rotating union part 14a. Seals 18a are generally arranged between the fluid material inlets and the fluid passages 28a, 28b formed between the non-rotating union part 12a and the rotating union part 14a. Such a rotary union 10a is used for supplying a rotating device 16a such as rolls or rollers having a shaft 20 and cooperatively rotate about the longitudinal axis 24 and whose ends can be supported by support bearings with a fluidic material. The support bearings can be arranged inside or outside of the space through which the fluidic material flows.

Similar to the discussion relating to the rotary union 10 discussed supra, first fluid passage 28a is provided in fluid communication with a source of pressurized fluidic material through an associated fluid material inlet 40a and fluid ring 26a. Additionally, a second fluid passage 28b can be provided in fluid communication with a second source of pressurized fluidic material through an associated fluid material inlet 40b and fluid ring 26b. Both first fluid passage 28a and second fluid passage 28b are respectively positioned within rotating union part 14a in a manner that satisfies Equation 15, described supra.

Fluid passages 28a, 28b are positioned within rotating union part 14a and generally orbit about the axis of rotation 24. Rotating union part 14a is received within a cavity within non-rotating union part 12.a and secured therein by a retaining clip 36 and is secured to the rotating device 16a by means known to those of skill in the art for securing mechanical members together including bolts that extend into the mating end of rotating device 16a. The longitudinal axis 24 of the rotary union 10a lies along the longitudinal axis of rotating device 16a.

Suitable static sealing members 34a, 34b such as O-rings and the like known to those of skill in the art, can be provided for sealing rotating device 16a and its associated fluid passages 28a, 28b of rotating union part 14a of rotary union 10a for creating fluid communication by and between respective inlets 46a, 46b of fluid channels 38a, 38b of rotating device 16a and respective fluid material outlets 44a, 44b of fluid passages 28a, 28b of rotary union 10a respectively. Fluid channels 38a, 38b of rotating device 16a are both disposed within rotating device 16b in a manner that satisfies Equation 16, described supra.

The fluid material inlets and associated fluid rings 26a, 26b are formed in non-rotating union part 12a to provide fluid communication with the respective fluid passages 28a, 28b and the fluid chamber defined by and between rotating union part. 14a and the cavity formed within non-rotating union part 12a for seating rotating union part. 14a. Suitable provisions are also provided for providing fluid communication between a respective fluid passage 28a, 28b and a respective bleed port 32a, not shown. In a preferred embodiment, bleed port 32a is provided in an orientation that disposes bleed port 32a at the top of non-rotating union part 12a of rotary union 10a. In any regard, bleed port 32a should be disposed in an orientation that facilitates the removal of any vapors disposed within the respective fluid passages 28a, 28b of rotary union 10a or the respective fluid channels formed or integral with of rotating device 16a and to form a passageway extending therebetween. Suitable fluid conduit connections can be provided in fluid communication with the respective fluid material inlet, fluid passages 28a, 28b, the respective fluid channels disposed within rotating device 16a, and associated bleed ports 32, 32a.

Rotary union 10a further includes a suitable provision such as bearings 30a to enable the removeable and rotatable mounting of rotating union part 14a to a shaft or other inner element disposed within rotating device 16a. Bearings 30a are held in position relative to non-rotating union part. 12a and rotating union part, 14a by retaining clip 36.

Seals 18a and fluid rings 26a, 26b can be positioned between the non-rotating union part 12a and rotating union part 14a and seal the fluid passages 28a, 28b to prevent cross-contamination of fluidic materials from one fluidic material segment to, for example, an adjacent fluidic material segment in the multi-fluidic rotary union. As with the single fluidic media embodiment discussed supra, the surface providing contacting engagement between the non-rotating union part 12.a and/or rotating union part 14a may be treated with a friction-reducing material or substance to act as a bearing surface.

Again, where it is indicated that the source of fluid pressure and non-rotating union part 12a are stationary, this is, of course, only a frame of reference. The rotation of shaft 20, rotating union part 14a, and any associated rotational control apparatus portions as described are with respect to the rotational position of the source of fluid pressure. Of course, if the source of fluid pressure is rotating, the other parts described would have rotational relationships with respect to the rotational position of the source of fluid pressure. Further, it should be immediately obvious that any rotational control apparatus which requires parts or portions to be fluidically actuated and are rotating at differing speeds are intended to be embraced herein.

Figure 11:
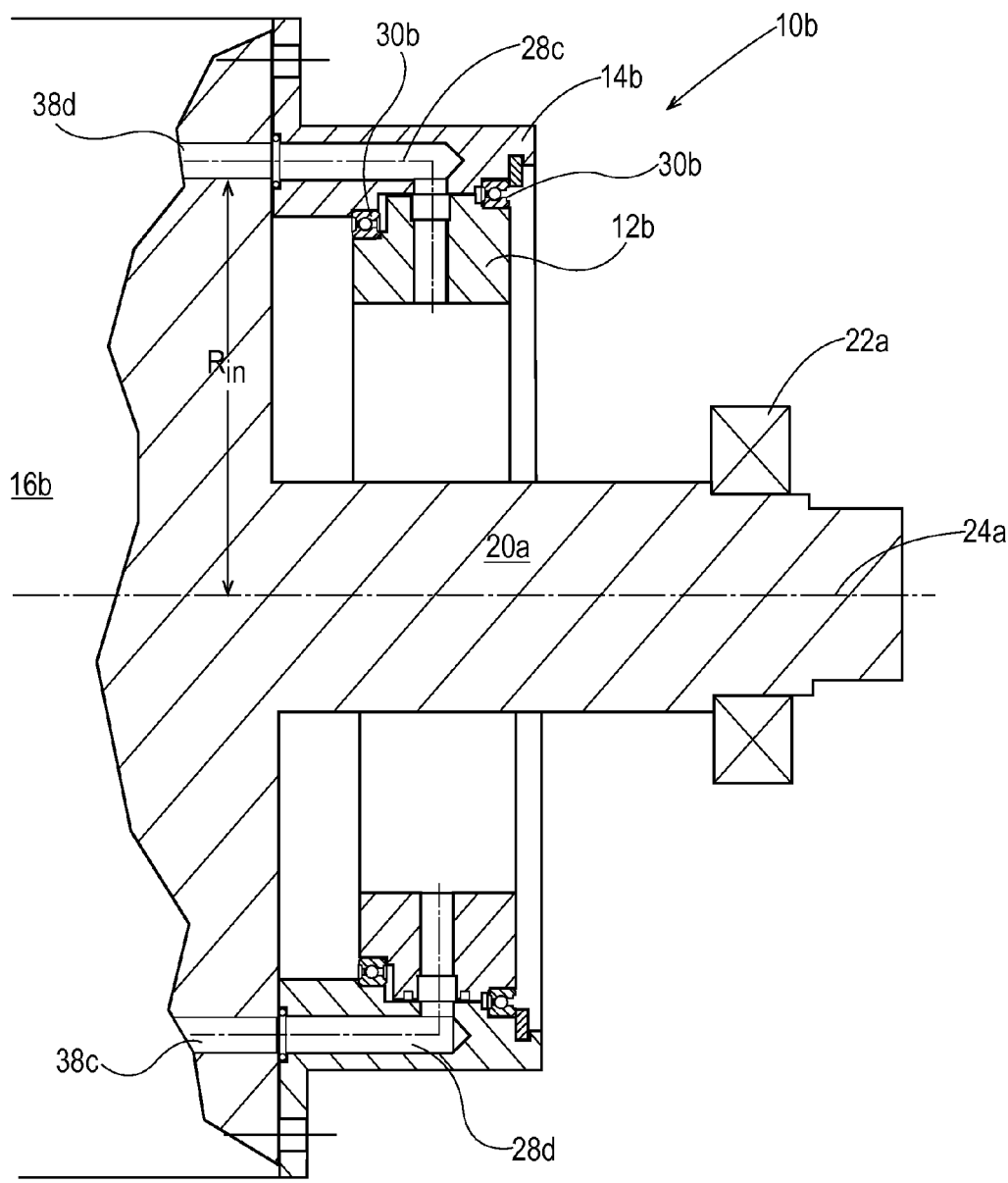
FIG. 11 is a cross-sectional view of yet another alternative embodiment of a rotary union placed in contacting and fluidic engagement with a rotating device and disposed between the bearing supporting a rotating device and the rotating device and the rotating union part is disposed about the non-rotating union part; and, FIG. 12 is a cross-sectional view of still another alternative embodiment of a rotary union placed in contacting and fluidic engagement with a rotating device where the non-rotating part of the rotary union comprises the support bearing for the rotating device.
Figure 12:
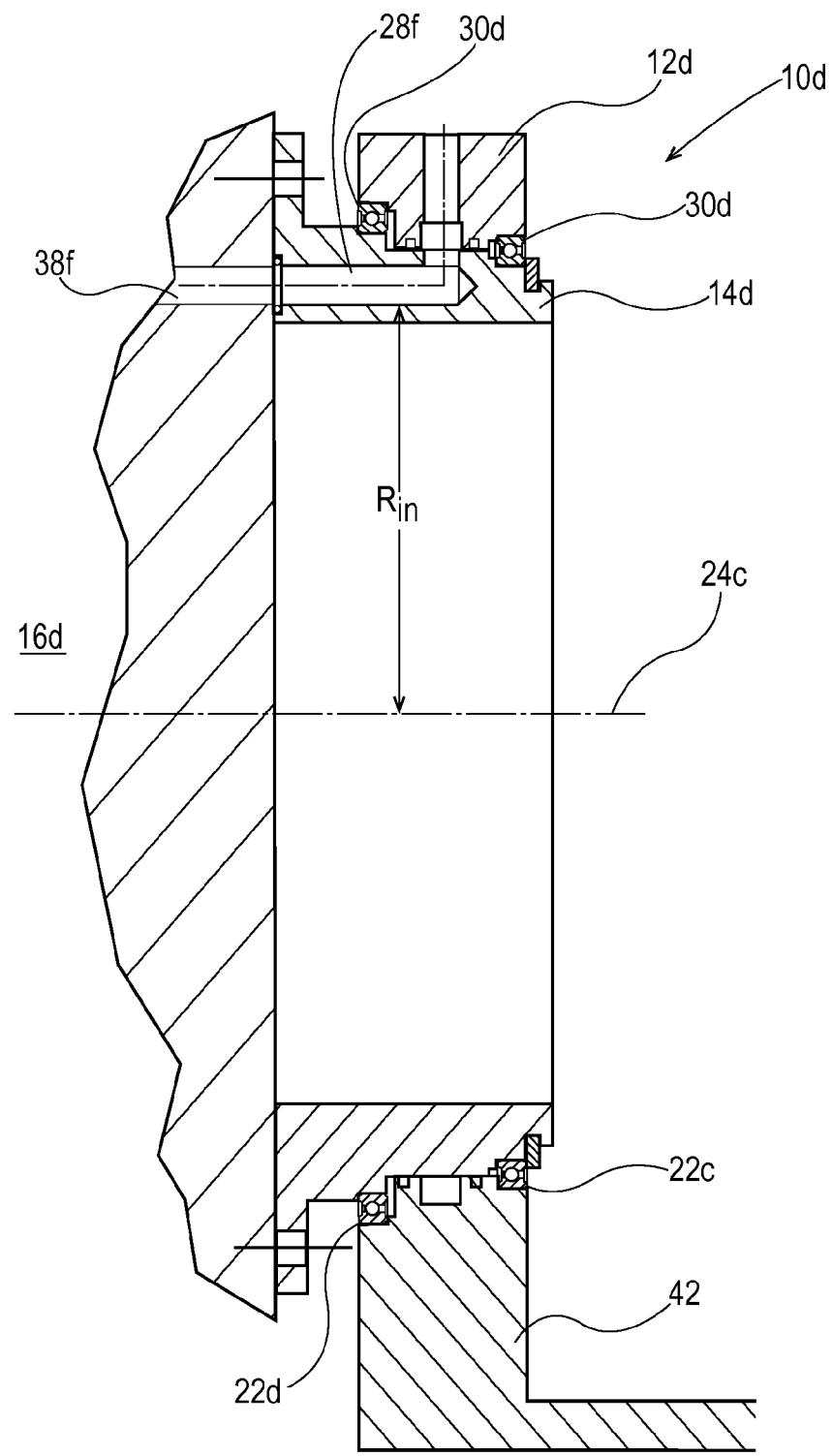

As mentioned supra, the support bearings utilized for the support of rotating devices and rotary unions coupled thereto as described herein can be positioned to provide the rotary union at a position outside the support bearing 22b (e.g., FIG. 10), between the support bearing 22a and rotary device 16b (e.g., FIG. 11), or even provide the support bearings 22c as incorporated into the rotary union 10 within the space through which the fluid or fluidic material flows (e.g., FIG. 12).

Figure 10:
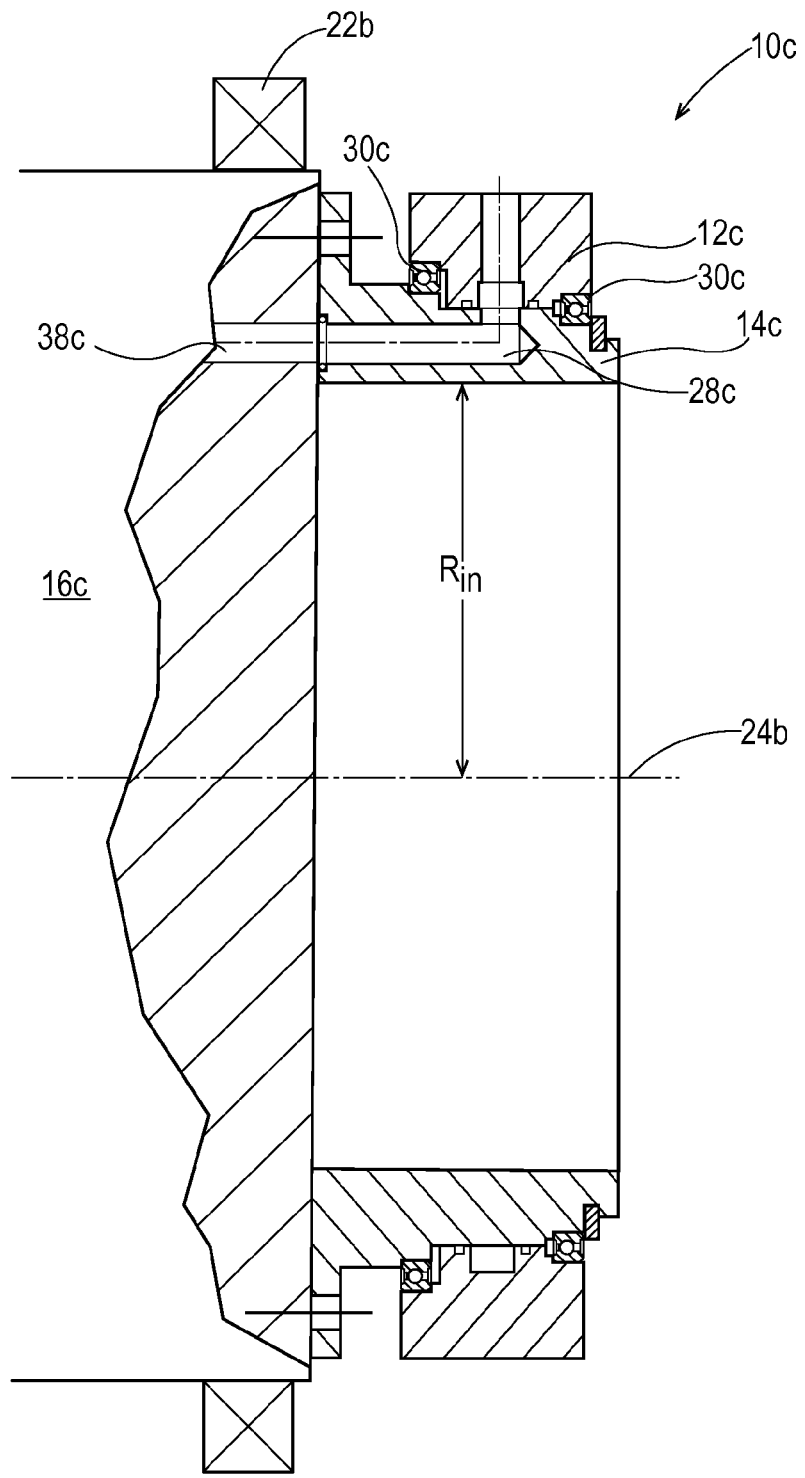
FIG. 10 is a cross-sectional view of another alternative embodiment of a rotary union placed in contacting and fluidic engagement with a rotating device and is disposed outside the bearing supporting a rotating device.

As depicted in FIG. 10, support bearing 22b used to support rotating device 16c coupled with exemplary rotary union 10c are positioned coaxially about rotating device 16c. This enables rotary union 10c to be positioned entirely outside the support bearing 22b and rotating device 16c. In this embodiment, non-rotating union part 12c is disposed coaxially about rotating union part 14c which rotates about axis of rotation 24b. A fluid can be fluidly communicated from fluid passage 28e to fluid channel 38e. Alternatively, it would be understood by one of skill in the art that rotating device 16c could be supported by a shaft which in turn could be supported by and in bearing engagement with support bearing 22b. In this case, rotary union 10c would be positioned on the side of bearing 22b that is opposite the side proximate to rotating device 16c. Rotary union would provide a fluid from a respective fluid passage to a respective fluid channel through the shaft supporting the rotating device.

As depicted in FIG. 11, support bearing 22a is positioned upon shaft 20a that supports rotating device 16b. Rotary union 10b can be positioned entirely between the support bearing 22a and rotating device 16b. As shown, rotating union part 14b is disposed coaxially about non-rotating union part 12b and rotates about axis of rotation 24a. A fluid can be fluidly communicated from fluid passages 28c, 28d to fluid channels 38d, 38c respectively. This arrangement can provide a rotary union capable of disposing a fluid at any radial position disposed away from the axis of rotation 24a and can prevent the centrifugal forces produced during rotation from creating a region(s) of low pressure (i.e., "pull a vacuum") within fluid channels 38c, 38d, or the portions of fluid channels 38c, 38d, that may be disposed in the region proximate to the axis of rotation 24a of the rotating union part 14b when rotating device 16b and rotating union part 12b are provided with a high rotational (line) speed. Here, there is no need to provide and/or confine any portion of fluid passage 28c, 28d disposed within rotating union part 14b to the region proximate to shaft 20a as is done with currently rotary union designs and commercially available rotary unions. Rather, the portion of fluid passage 28c, 28d disposed within rotating union part 14b and connected to a respective fluid channel 38c, 38d of rotating device 16b may be disposed at any radial position relative to the axis of rotation 24a in accordance with Equation 15. This can provide fluid communication with a fluid channel 38d disposed within, or even upon the surface of, rotating device 16b at any location therein/thereon.

As depicted in FIG. 12, rotary union 10d can be and/or directly provide a support bearing (or bearings) 22c, 22d for support of rotating device 16d. In this exemplary embodiment, support bearings 22c, 22d are positioned coaxially about rotating union part 14d. This embodiment can enable non-rotating union part 12d to be mechanically and/or otherwise structurally tied to a support structure 42 for direct support of the combined rotating union part 14d of rotary union 10d and rotating device 16d. In other word the entire inertia of the rotating union part 14d and rotating device 16d is supported by support bearing (or bearings) 22c, 22d, non-rotating union part 12d, and support structure 42. As would be clear to one of skill in the art, non-rotating union part 12d is disposed coaxially about rotating union part 14d which rotates about axis of rotation 24c. A fluid can be fluidly communicated from fluid passage 28f to fluid channel 38f of a rotating device 16d.

This arrangement can also provide a rotary union capable of disposing a fluid at any location disposed away from the axis of rotation 24a and can prevent the centrifugal forces produced during high rotational speeds from creating a region(s) of low pressure (i.e., "pull a vacuum") in any fluid channels, or the portions of any fluid channels, disposed in the region proximate to the axis of rotation 24a of the rotating union part 14d. In other words, there is no need to confine the portion of fluid passage 28f disposed within rotating union part 14d to the region proximate to the axis of rotation 24a as is done with currently rotary union designs and commercially available rotary unions. Rather, the portion of fluid passage 28f disposed within rotating union part 14d may be disposed at any location relative to the axis of rotation 24a in accordance with Equation 15 in order to provide fluid communication with a fluid channel 38f disposed within, or even upon, rotating device 16d at any location therein/thereon.

One of skill in the art should recognize that the rotary union 10 of the present description or any of the component parts of the rotary union 10 of the present description may be heated and/or cooled. It should also be recognized that the application of heating and/or cooling can as help to control the clearance/interference of the parts comprising rotary union 10. This can be especially helpful in maintaining fluid routing integrity. For example, heating or cooling, when appropriately applied, can help regulate the amount of compression on the seals 18.

Additionally, heating or cooling of the rotary union 10 of the present description or any of the component parts of the rotary union 10 of the present description can help to control viscosity of the fluid being used. One of skill in the art will recognize that many fluids have a temperature dependent viscosity. Controlling the viscosity can make it easier to apply the desired amount of a fluid, the "bloom" of the fluid on a substrate, the potential release characteristics of the fluid for application to a substrate, and the propensity of a fluid to sling out of a roll for examples. In other words, the rotary union 10 could act as a heat exchanger to cool or heat a fluid depending on what is desired for the process.

Further, temperature control of the rotary union 10 also can be used as an aid to help de-gas some fluids. One of skill in the art will recognize that some fluids can often de-gas better and/or worse depending upon their temperature.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. An apparatus for supplying fluid from a stationary inlet to a rotating outlet comprising:
   a rotating device, said rotating device being rotatable about an axis and having a fluid channel disposed therein;
   a rotary union operatively engaged with said rotating device, said rotary union comprising:
      a rotating union part rotatable about said axis and matingly engageable with said rotating device;
      a non-rotating union part disposed coaxially about and surrounding said rotating union part and coupled to a support structure, said non-rotating union part comprising a support bearing, said support bearing being disposed between said non-rotating union part and said rotating union part, said support bearing supporting said rotating device; and,
      a fluid passage disposed within said rotary union, said fluid passage comprising:
         a fluid material inlet disposed upon a surface of said non-rotating union part;
         a first portion in fluid communication with said fluid material inlet disposed within said non-rotating union part; and,
         a second portion disposed within said rotating union part and having a fluid material outlet disposed upon a surface of said rotating union part;
      wherein said surface of said rotating union part is matingly engageable with said rotating device to provide fluid communication of a fluid from said fluid passage to said fluid channel; and,
      wherein said fluid is communicatable through said fluid passage from said fluid material inlet, through said first portion, into said second portion, to said fluid material outlet, and to said at least one fluid channel.

2. The apparatus of claim 1 further comprising a bleed port in fluid communication with said fluid passage, said bleed port being disposed within said non-rotating union part.

3. The apparatus of claim 1 wherein at least one of said non-rotating union part and said rotating union part are heated.

4. The apparatus of claim 1 wherein at least one of said non-rotating union part and said rotating union part are cooled.

5. The apparatus of claim 1 further comprising seals disposed between and engaging said rotating union part and said non-rotating union part, said seals providing sealed fluid communication of said first portion of said fluid passage disposed within said non-rotating union part with said second portion of said fluid passage disposed within said rotating union part.

6. The apparatus of claim 1 wherein said rotating device comprises a web-contacting surface, said surface being disposed at a distance, $R_{out}$, relative to said axis and wherein said second portion of said fluid passage is disposed within said rotating union part at a distance, $R_{in}$, from said axis defined by the relationship:

$$\frac{R_{in}}{R_{out}} > \sqrt{1 - \frac{2(P_{out} - P_v + P_f)}{\rho v^2}}$$

where:
$P_{out}$=static pressure of said fluid channel at a distal end;
$P_v$=fluid vapor pressure;
$P_f$=pressure drop throughout said fluid channel due to friction;
$\rho$=fluid density; and,
$v$=said rotating device surface velocity.

7. The apparatus of claim 6 wherein $$\frac{R_{in}}{R_{out}} < 1.$$

\* \* \* \* \*